United States Patent [19]

Tanaka et al.

[11] Patent Number: 4,975,790
[45] Date of Patent: Dec. 4, 1990

[54] TAPE RECORDER HAVE REEL STOP DETECTING MECHANISM

[75] Inventors: Shinsaku Tanaka, Tokyo; Tadao Arata, Inagi; Kunio Kido, Wako, all of Japan

[73] Assignee: Tanashin Denki Co., Ltd., Tokyo, Japan

[21] Appl. No.: 230,591

[22] Filed: Aug. 10, 1988

Related U.S. Application Data

[63] Continuation-in-part of Ser. No. 943,742, Dec. 19, 1986, Pat. No. 4,791,506.

[30] Foreign Application Priority Data

Jul. 14, 1986 [JP] Japan ................................ 61-107602

[51] Int. Cl.⁵ ............................................ G11B 15/48
[52] U.S. Cl. ..................................... 360/74.2; 242/191
[58] Field of Search ........................ 360/74.2; 242/191

[56] References Cited

U.S. PATENT DOCUMENTS 1,144,362  6/1915  Kempff ................................ 242/191

Primary Examiner—A. J. Heinz
Attorney, Agent, or Firm—Wegner, Cantor, Mueller & Player

[57] ABSTRACT

A mechanism for detecting stopping of rotation of a normally rotating member which mechanism can be minimized in its axial direction and reduced in production cost. The mechanism comprises a normally rotating member normally rotating in one direction around a fixed axis, and a detecting member for detecting stopping of rotation of the normally rotating member. One of the two members has a resilient contacting portion for resiliently contacting and fitting with the other member under a radially acting resilient force of the same thereby to produce a contact pressure between the two members. The detecting member is urged in a direction by the normally rotating member when the normally rotating member is rotating, and the detecting member detects stopping of rotation of the normally rotating member from disappearance of the urging force by the normally rotating member.

6 Claims, 5 Drawing Sheets

TAPE RECORDER HAVE REEL STOP DETECTING MECHANISM

This application is a continuation-in-part of Ser. No. 943,742 filed Dec. 19, 1986 (now U.S. Pat. No 4,791,506).

BACKGROUND OF THE INVENTION

1. Field of the Invention

This invention relates to a tape recorder of the type wherein stopping of a reel receiving member is detected to activate a particular mechanism of the tape recorder such as an automatic stopping mechanism or an automatic reversing mechanism.

2. Description of the Prior Art

Tape recorders are already known wherein when a reel receiving member is stopped, for example, at an end of a tape, an automatic stopping mechanism, an automatic reversing mechanism or some other mechanism is activated.

In a conventional tape recorder of the type described, a tape tension detecting member is mounted on a head carrying member on which a magnetic head is carried, and in a reproduction or recording operating mode of the tape recorder, the tape tension detecting member is pressed against a magnetic tape at a position near the magnetic head so that the tape travels along a partially bent or curved path.

Accordingly, when the tape comes to its end in the reproduction or recording operating mode of the tape recorder, the tension of the tape will increase suddenly and thus attempt to straighten the partially bent or curved portion of the tape. This will push the detecting member to move back to its home position. Such movement of the detecting member then is thus used to activate a particular mechanism of the tape recorder such as an automatic stopping mechanism or an automatic reversing mechanism.

Since in a reproduction or recording operating mode of the tape recorder the tape tension detecting member is pressed against a magnetic tape so that the tape runs along a partially bent or curved path in this manner, the conventional tape recorders have following problems:

(1) Since a magnetic tape is pressed by the detecting member, the resistance to the tape during running is high. Consequently, the contacting pressure of a pinch roller to a capstan must be high accordingly, and hence a spring is necessitated which provides such a high contacting pressure. As a result, the capstan undergoes a high lateral pressure, which make designing of a bearing difficult. Besides, a high operating force is required for reproduction or recording operation.

(2) Since a tape runs along a partially bent or curved path, running of the tape is unstable, which is particularly remarkable at a joint of tapes.

Also a rotation stopping detecting mechanism for a tape recorder is already known which directly detects stopping of rotation of a reel receiving member at an end of a tape.

Referring to FIG. 17, there is shown a tape recorder in which such a rotation stopping detecting mechanism in incorporated. The tape recorder shown includes a main base plate 101, a reel shaft 102 securely mounted on and extending upwardly from the main base plate 101, and a unitary structure of a reel receiving member 103 and a sleeve 105 mounted for rotation round the reel shaft 102. The sleeve 105 has a flange 104 formed at a lower end thereof.

A gear 107 is mounted for rotation on an upper face of the flange 104 of the sleeve 105 with a felt plate 109 interposed therebetween, and a compression coil spring 108 is interposed between the gear 107 and the reel receiving member 103. An engaging projection 112 is formed on the extends downwardly from a lower face of the gear 107. A detecting member 110 in the form of a flat plate is mounted for rotation on a lower face of the flange 104 of the sleeve 105 with another felt plate 109 interposed between, and another compression coil spring 111 is interposed between the detecting member 110 and the main base plate 101.

If a turning force of a motor not shown is applied to the gear 107, it is transmitted to the reel receiving member 103 via the felt plate 106 on the upper face side of the flange 104 and further to the detecting member 110 via the felt plate 109 on the lower face side of the flange 104. An operating member 113 is normally located at a portion thereof in a locus of turning motion of the detecting member 110 so that, during rotation of the gear 107, the operating member 113 may be engaged by the detecting member 110 and thus normally acted upon by an uging force or turning torque of the detecting member 110. If the reel receiving member 103 is stopped from rotation due to an excessive load applied thereto, then the urging force will no more act upon the detecting member 110. Consequently, the operating member 113 is displaced by a biasing force of a spring not shown to a predetermined position in which part of the operating member 113 is positioned on a locus of turning motion of the engaging projection 112 on the lower face of the gear 107.

With the construction of the rotation stopping detecting mechanism, when the reel receiving member 103 is stopped, part of the operating member 113 is moved into the locus of turning motion of the engaging projection 112 on the gear 107. Consequently, the operating member 113 is subsequently moved compulsorily against the biasing force of the spring not shown by the turning force of the gear 107. Accordingly, if an automatic stopping mechanism or an automative reversing mechanism is associated with the operating member 113 such that the former may be rendered operative by such compulsory movement of the latter, then the former will be operated by the turning force of the drive motor not shown in response to stopping of the reel receiving member 103.

With the conventional rotation stopping detecting mechanism having such a construction as shown in FIG. 17, however, in order to exert a turning torque or urging force in the same direction as the direction of rotation of the reel receiving member 103 to the detecting member 110, the felt plate 109 is interposed between the the flange 104 integral with the reel receiving member 103 and the detecting member 110, and the detecting member 110 is biased toward the flange 104 by the compression coil spring 111. It is therefore difficult to reduce the dimension of the rotation stopping detecting mechanism in the axial direction. Accordingly the conventional rotation stopping detecting mechanism is disadvantageous to an application wherein it is required to have a relatively small axial dimension. Besides, it is desired to minimize the number of components eliminating such a compression coil spring or a felt plate as described above in order to reduce the production cost.

SUMMARY OF THE INVENTION

It is an object of the present invention to provide a tape recorder wherein stopping of a reel receiving member in a reproduction or recording operating mode of the tape recorder is detected assuredly to activate a particular mechanism of the tape recorder such as an automatic stopping mechanism or an automatic reversing mechanism without a high contacting pressure of a pinch roller to a capstan while assuring a high stability of running of a tape.

It is another object of the present invention to provide a rotation stopping detecting mechanism which can be minimized in its axial direction and can be reduced in production cost eliminating the necessity of comparatively expensive parts including a compression coil spring and a felt plate.

In order to attain the objects, according to one aspect of the present invention, there is provided a tape recorder of the type which includes a reel receiving member, a rotary member connected to be driven to rotate by a motor by way of frictional motion transmitting means and having an engaging portion thereon, a detecting member normally held in contact with the reel receiving member or a rotatable member which is rotated and stopped in synchronism with the reel receiving member such that the detecting member may be urged in a predetermined direction by an urging force caused by a turning force of the reel receiving member or the rotatable member, and an operating member located near the rotary member and having an engaging portion thereon, whereby while the reel receiving member is rotating, the operating member is continuously urged in a predetermined direction by the urging force produced at the detecting member thereby to prevent engagement between the engaging portion of the rotary member and the engaging portion of the operating member, but when the urging force of the detecting member disappears, the engaging portion of the rotary member is engaged with the engaging portion of the operating member to operate the operating member thereby to activate a particular mechanism of the tape recorder, wherein the rotary member further has a cam face extending around the center of rotation thereof and having an end contiguous to the engaging portion thereof while the operating member further has an abutting portion for abutting engagement with the cam face of the rotary member, and a slidably contacting face contiguous to the abutting portion thereof and located such that when the engaging portion of the rotary member is slidably contacted with the slidably contacting face of the operating member, the engaging portion of the operating member is positioned on a locus of rotation of the engaging portion of the rotary member, and wherein the operating member is associated with a movable member which has different positions for a reproduction or recording operating mode and for any other operating mode of the tape recorder such that only while the tape recorder is in the reproduction or recording operating mode, the engaging portion of the operating member is positioned on the locus of rotation of the engaging portion of the rotary member when the urging force of the detecting member disappears, and when the tape recorder is in any other operating mode, the engaging portion of the operating member is positioned at a non-engageable position spaced from the locus of rotation of the engaging portion of the rotary member.

Accordingly, when the tape recorder is in the reproduction or recording operating mode, while the reel receiving member is rotating, engagement between the engaging portion of the rotary member and the engaging portion of the operating member is prevented by the urging force produced at the detecting member by rotation of the reel receiving member. However, if the reel receiving member is stopped so that the urging force of the detecting member disappears, the engaging portion of the rotary member is engaged with the engaging portion of the operating member to operate the operating member thereby to activate a particular mechanism of the tape recorder such as an automatic stopping mechanism or an automatic reversing mechanism.

To the contrary, when the tape recorder is in any other operating mode than the reproduction or recording operating mode, for example, in an operating mode of FF (fast feeding), rewinding, or pause (except a stopping condition), the operating member is positioned at its non-engageable position. Accordingly, not only during rotation of the reel receiving member but also when the reel receiving member is stopped at an end of a tape, no engagement between the engaging portion of the rotary member and the engaging portion of the operating member is established.

With the tape recorder, stopping of rotation of the reel receiving member when the tape recorder is in the reproduction or recording operating mode is detected assuredly to activate a particular mechanism without increasing the contacting pressure of a pinch roller to a capstan and without deteriorating the stability of running of a tape.

According to another aspect of the present invention, there is provided a rotation stopping detecting mechanism of the type wherein a normally rotating member normally rotating in one direction around a fixed axis is normally held in frictional contact with a detecting member to exert a turning torque to the detecting member such that the detecting member detects stopping of rotation of the normally rotating member from disappearance of the turning torque by the normally rotating member, the rotation stopping detecting mechanism being constituted such that the detecting member is fitted on an outer periphery of the normally rotating member by way of a resiliently contacting portion which is provided on one of the detecting member and the normally rotating member for resiliently contacting with the other of the detecting member and the normally rotating member under a radially acting resilient force of the resilient contacting portion thereby to produce a contacting pressure between the detecting member and the normally rotating member.

With the rotation stopping detecting mechanism, the resilient contacting portion provided on one of the normally rotating member and the detecting member resiliently frictionally contacts with the other member to produce a contact pressure between the normally rotating member and the detecting member. Accordingly, as the normally rotating member rotates, the detecting member is acted upon by an urging force or turning torque in the same direction as the direction of rotation of the normally rotating member. When the normally rotating member is stopped, the detecting member is no more acted upon by such an urging torque from the normally rotating member, thereby detecting stopping of rotation of the normally rotating member.

With the construction, the rotation stopping detecting mechanism can be constructed with a reduced axial dimension from a minimized number of parts and can be produced at a reduced cost.

The above and other objects, features and advantages of the present invention will become apparent from the following description and the appended claims, taken in conjunction with the accompanying drawing.

DESCRIPTION OF THE PREFERRED EMBODIMENTS

Figure 1:
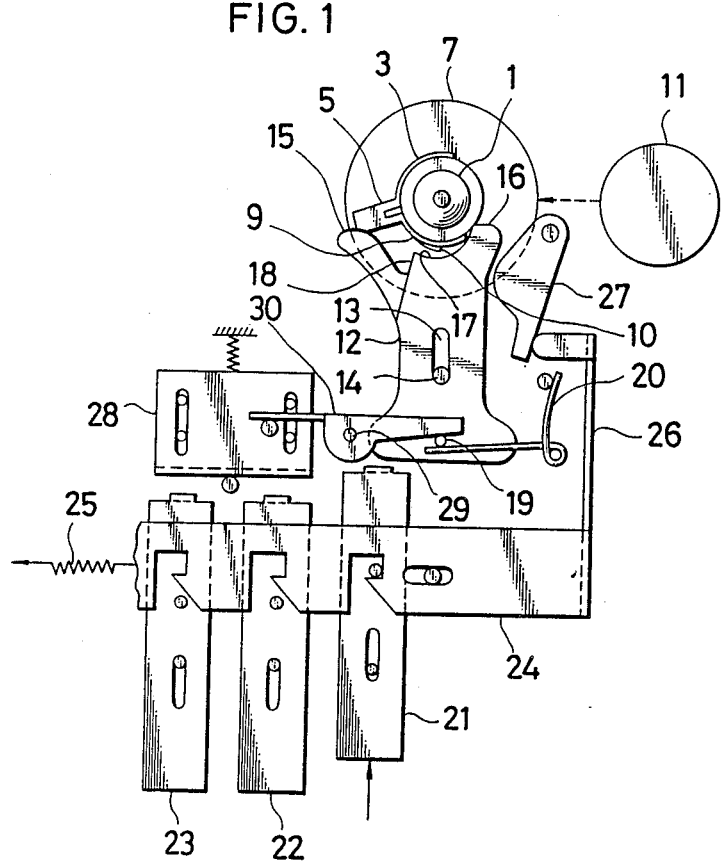
FIG. 1 is partial plan view of a tape recorder illustrating a preferred embodiment of the present invention.
Figure 2:
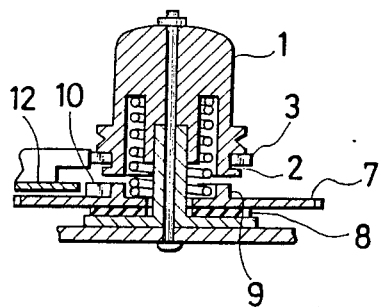
FIG. 2 is a vertical sectional view, in an enlarged scaled, of a reel receiving member and its associated parts of the tape recorder of FIG. 1.

Referring first to FIGS. 1 to 5, there is shown a tape recorder according to a first embodiment of the present invention. The tape recorder shown includes a reel receiving member 1 adapted to receive a reel hub of a tape cassette thereon and serving as a normally rotating member of a rotation stopping detecting mechanism. The reel receiving member 1 has an annular groove 2 formed on an outer periphery of a lower portion thereon as shown in FIG. 2. A detecting member 3 is fitted in the annular groove 2 of the reel receiving member 1.

Figure 3:
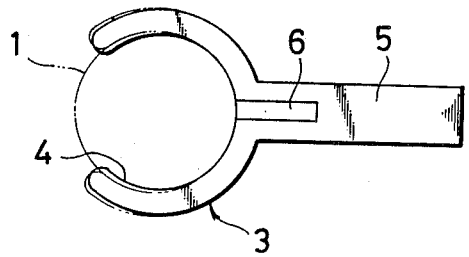
FIG. 3 is a plan view, in a somewhat enlarged scale, of a detecting member of the tape recorder of FIG. 1.

The detecting member 3 is formed from a thin synthetic resin plate and has a substantially C-shaped fitting portion 4 and a pressing portion 5 extending outwardly from the center of the fitting portion 4 and having a slit 6 formed therein which extends outwardly from an inner periphery of the fitting portion 4 as shown in FIG. 3. The inner periphery of the fitting portion 4 of the detecting member 3 has an inner diameter somewhat smaller diameter than the outer diameter of the bottom of the annular groove 2 of the reel receiving member 1, and the distance between opposite ends of the fitting portion 4 is further smaller than the outer diameter of the bottom of the annular groove 2 so that the fitting portion 4 of the detecting member 3 may partially embrace the reel receiving member 1. In order to allow the bottom of the annular groove 2 of the reel receiving member 1 to be fitted in the inner periphery of the fitting portion 4 of the detecting member 3 and in order to produce a suitable contacting pressure of the fitting portion 4 to the reel receiving member 1, the fitting portion 4 is provided with suitable resiliency. Accordingly, in assembling the detecting member 3 to the reel receiving member 1, the former will be forced axially toward the latter with the opposite ends of the fitting portion 4 of the former received in the annular groove 2 of the latter whereupon opposite end portions of the fitting portion 4 will be first yielded away from each other by the reel receiving member 1 and then allowed to embrace the reel receiving member 1 with its entire inner periphery under a suitable contacting force provided by the resiliency of the fitting portion 4. The slit 6 in the pressing portion 5 of the detecting member 3 contributes to production of such resiliency of the fitting portion 4, but where the fitting portion 4 has such suitable resiliency, the slit 6 is not necessary and can be omitted.

A rotary member 7 in the form of a gear wheel is mounted in a coaxial relationship with the reel receiving member 1. Rotation of the rotary member 7 is transmitted to the reel receiving member 1 by way of a friction member 8 such as a friction plate made of felt.

Figure 4:
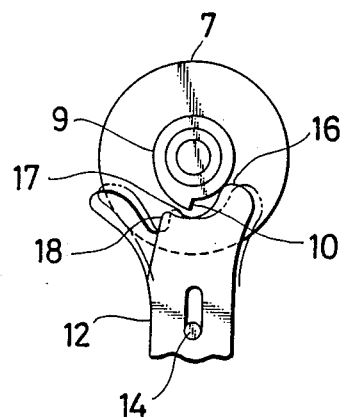
FIG. 4 is a plan view showing a relation between an an operating member and a cam face of a rotary member of the tape recorder of FIG. 1.

The rotary member 7 has a cam face 9 formed on an upper surface thereof and surrounding the center of rotation thereof as shown in FIG. 4. The cam face 9 of the rotary member 7 has a substantially spiral shape and defines, at an end thereof at which it has a maximum radius, a shoulder which serves as an engaging portion 10. The rotary member 7 is connected to be driven to rotate by a motor 11. An end of an operating member 12 in the form of a plate is located above the rotary member 7.

The operating member 12 has an elongated hole 13 formed at a location near the center of gravity thereof and is mounted for back and forth and pivotal movement along and around a fixed pin 14 erected on a tape recorder base plate. The operating member 12 has, at the end thereof above the rotary member 7, a pressure receiving portion 15 located for abutting engagement by the pressing portion 5 of the detecting member 3, an abutting portion 16 for abutting engagement with the cam face 9 of the rotary member 7, a slidably contacting face 17 contiguous to the abutting portion 16, and an engaging portion 18 contiguous to the slidably contacting face 17. The operating member 12 further has an engaging pin 19 formed projectingly at the other end thereof.

The engaging pin 19 is engaged by an end portion of a torsion spring 20 so that the operating member 12 is normally urged in a forward direction. Thus, when the operating member 12 is at a position pushed by the spring 20, the pressure receiving portion 15 of the operating member 12 is continuously pressed by the pressing portion 5 of the detecting member 3 due to a turning force of the detecting member 3 in a counterclockwise direction in FIG. 1 as and while the reel receiving member 1 rotates in the counterclockwise direction. Accordingly, the operating member 12 is pivoted in a counterclockwise direction in FIG. 1 until the abutting portion 16 thereof abuts with the cam face 9 of the rotary member 7. Meanwhile, when the engaging portion 10 of the rotary member 7 is slidably engaged with the slidably contacting face 17 and then presses against the abutting portion 16 of the operating member 12, the engaging portion 18 of the operating member 12 is located on a locus of rotation of the engaging portion 10 as shown in phantom in FIG. 4. However, after the engaging portion 10 passes the abutting portion 16, the operating member 12 is pivoted in the counterclockwise direction in FIG. 4 until the abutting portion 16 thereof is slidably contacted with the cam face 9 of the rotary member 7 again to move the engaging portion 18 thereof out of the locus of rotation of the engaging portion 10 of the rotary member 7. Accordingly, so far as the reel receiving member 1 is rotating, engagement of the engaging portion 10 of the rotary member 7 with the engaging portion 18 of the operation member 12 will not occur.

The tape recorder further includes a reproduction operating member 21, a fast feeding operating member 22 and a rewinding operating member 23, and an arresting plate 24 for selectively holding one of the operating members 21, 22, 23 to its pushed in position (actuated position). The arresting plate 24 is normally urged in a direction to arrest an actuated one of the operating members 21, 22, 23 to its acutated position by means of a spring 25, but when a stopping operating member not shown is pushed in to its actuated position, it is moved in the opposite direction thereby to release the actuated operating member from its arrested actuated position. The arresting plate 24 has an extension 26. A pivotal member 27 is located near the rotary member 7 and interposed between the extension 26 of the arresting plate 24 and the abutting portion 16 of the operating member 12. Thus, when the operating member 12 is pivoted over a relatively large angular range in the clockwise direction in FIG. 1, the abutting portion 16 thereof will engage with and pivot the pivotal member 27 which in turn will press against the extension 26 of the arresting plate 24 to move the arresting plate 24 in the direction opposite to the direction of the urging of the spring 25, that is, in the direction to release an arrested one of the operating members 21, 22, 23 from its arrested actuated position.

The tape recorder further includes a movable member 28 in the form of a plate which is pushed to move forwardly when one of the fast feeding operating member 22 and the rewinding operating member 23 is pushed in. The movable member 28 normally engages with an end of a connecting member 30 which is mounted for pivotal motion around a shaft 29. The other end of the connecting member 30 opposes to the engaging pin 19 on the oerating member 12 from the side opposite to the spring 20.

Figure 5:
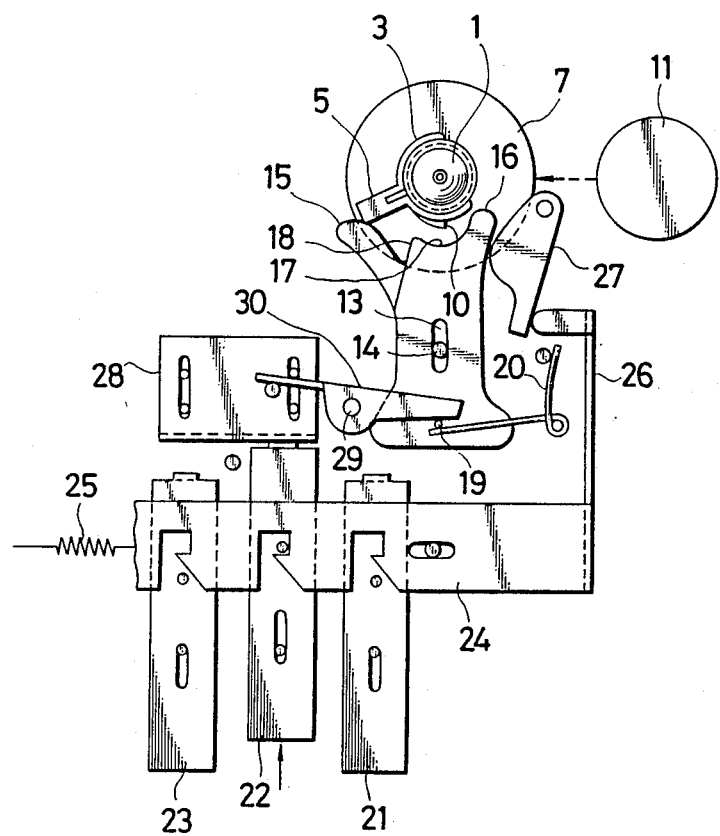
FIG. 5 is a view similar to FIG. 1 but illustrating the tape recorder in a fast feeding operating condition.

Thus, when the fast feeding operating member 22 or the rewinding operating member 23 is selectively pushed in, the movable member 28 is pushed thereby to move forwardly to pivot the connecting member 30 to move the operating member 12 back to its non-engageable position as shown in FIG. 5.

In this position, the engaging portion 18 of the operating member 12 is spaced far away from the locus of rotation of the engaging portion 10 of the rotary member 7. Consequently, whatever pivoted position the operating member 12 assumes, engagement of the engaging portion 10 of the rotary member 7 with the engaging portion 18 of the operating member 12 will occur no more.

Accordingly, with the contruction described above, when the tape recorder is in the reproduction or recording operating mode, engagement of the engaging portion 10 of the rotary member 7 with the engaging portion 18 of the operating member 12 is prevented by a turning force of the detecting member 3 produced by rotation of the reel receiving member while the reel receiving member 1 is rotating. To the contrary, if the reel receiving member 1 is stopped so that the turning force of the detecting member 3 disappears, then the engaging portion 10 is engaged with the engaging portion 18 to pivot the operating member 12 to a relatively large extent in the clockwise direction in FIG. 1 thereby to move, via the pivotal member 27, the arresting plate 24 to its arrest releasing direction to allow the reproduction operating member 21 to return from its actuated position to its home or non-actuated position. Consequently, the tape recorder is returned to its stopping condition.

To the contrary, in any other operation mode of the tape recorder than the reproduction or recording operating mode, for example, when the fast feeding operating member 22 is pushed in to bring the tape recorder into the FF (fast feeding) operating mode or when the rewinding operating member 23 is pushed in to bring the tape recorder into the rewinding operating mode, the operating member 12 is retracted to its non-engageable position as shown in FIG. 5. As a result, whether the reel receiving member 1 is rotating or is stopped at an end of a tape, the engaging portion 10 of the rotary member 7 is not at all engaged with the engaging portion 18 of the operating member 12.

Accordingly, in any other operating mode than the reproduction or recording operating mode, presence of the operating member 12 will have no bad influence on running of a tape. This will facilitate designing of a tape recorder and will contribute to reduction of its cost.

Meanwhile, the rotary member 7 has the cam face 9 for abutting engagement with the abutting portion 16 of the operating member 12 while the operating member 12 has, contiguously to the abutting portion 16, the slidably contacting face 17 for slidably contacting with the engaging portion 10 of the rotary member 7. Accordingly, while the engaging portion 10 is slidably contacted with the slidably contacting face 17 and then with the abutting portion 16 of the operating member 12, the abutting portion 16 is spaced away from the cam face 9, but when the engaging portion 10 is disengaged from the abutting portion 16, now the abutting portion 16 is slidably contacted with the cam face 9. Accordingly, no colliding noises will be produced when the engaging portion 10 is engaged with and disengaged from the abutting portion 10 each time the rotary member 7 makes one complete rotation.

Further, since the operating member 12 is supported at a portion near the center of gravity thereof by the fixed pin 14, in what posture the tape recorder is used, little displacement of the operating member 12 due to its own weight will appear. Accordingly, no operation in error will occur from such possible displacement of the operating member 12.

Figure 17:
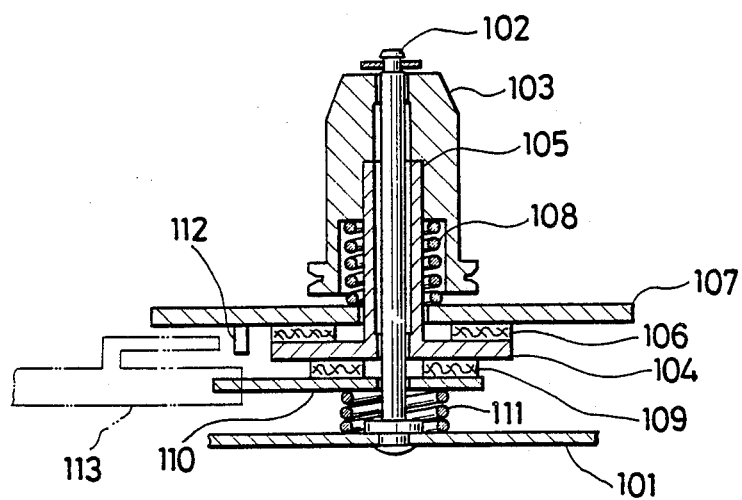
FIG. 17 is a vertical sectional view showing a conventional rotation stopping detecting mechanism.

Besides, in the assembled condition of the detecting member 3 wherein the C-shaped resilient contacting portion 4 thereof is fitted in the annular groove 2 formed on the reel receiving member 1, the inner face of the C-shaped resilient contacting portion 4 thereof is held in resilient frictional contact with the outer circumferential face of the bottom of the annular groove 2 of the reel receiving member 1. Accordingly, such parts as the spring 111 and the felt plate 109 in the conventional rotation stopping detecting mechanism shown in FIG. 17 can be eliminated. The rotation stopping detecting mechanism, accordingly, can be reduced in dimension in its axial direction and thus produced at a reduced cost.

It is to be noted while in the description of the embodiment given above the movable member 28 is moved forwardly to move the operating member 12 to its non-engageable position by a pushing in operation of the fast feeding or rewinding operating member 22 or 23, an alternative arrangement is also allowable wherein the operating member 12 is held to its non-engageable position by the reproduction or recording operating member when the reproduction or recording operating member is at its inoperative position and is moved forwardly from its non-engageable position by a pushing in operating of the reproduction or recording operating member.

Further, the movable member may be any member only if it has different positions for the reproduction or recording operating mode and for any other operating mode. For example, it is possible to employ, for the moveable member, a pinch roller support member on which a pinch roller is supported. Such an arrangement is illustrated in FIG. 6.

Figure 6:
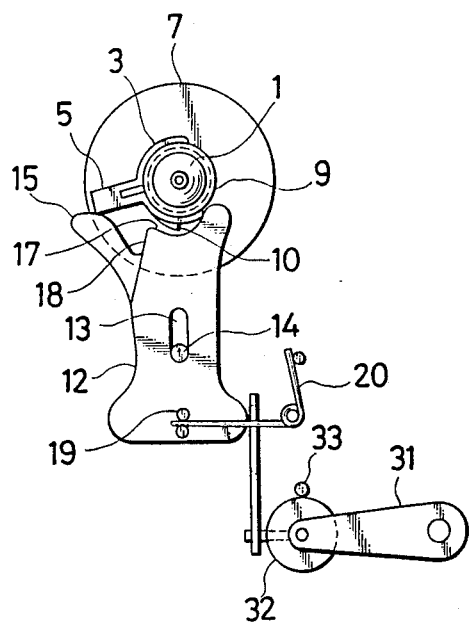
FIG. 6 is a partial plan view of a tape recorder illustrating another embodiment of the invention.

Referring to FIG. 6, a pinch roller 32 is supported on a pinch roller support member 31. The member 31 is located such that it presses the pinch roller 32 thereon against a capstan 33 when the tape recorder is in the reproduction or recording operating mode, but when the tape recorder is in any other operating mode, the member 31 assumes another position in which the pinch roller 32 thereon is spaced away from the capstan 33. The pinch roller support member 31 is associated with the operating member 12 as in the embodiment of FIG. 6. Accordingly, similar effects to those of the preceding embodiment will be obtained.

Figure 7:
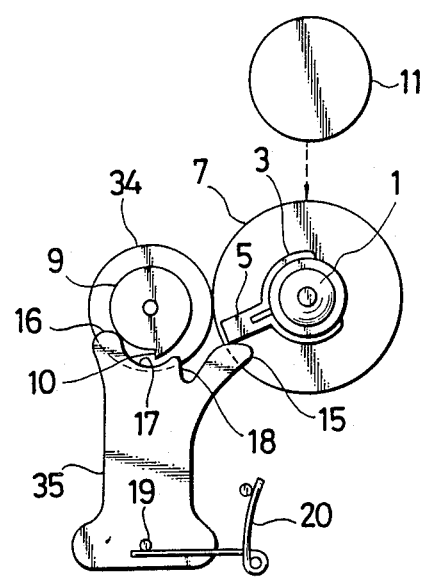
FIG. 7 is a partial plan view showing a further embodiment of the invention.

In the meantime, while in the preceding embodiments the rotary member is located in a coaxial relationship with the reel receiving member 1, it may otherwise be possible to make use of a turning force of another rotary member 34 as shown in FIG. 7 which cooperates (for example, meshes) with the rotary member 7 coaxial with the reel receiving member 1 in order to operate an operating member 35 which corresponds to the operating member 12.

Further, the detecting member is not necessarily provided in a coaxial relationship with the reel receiving member 1 as in the preceding embodiments, either.

Figure 8:
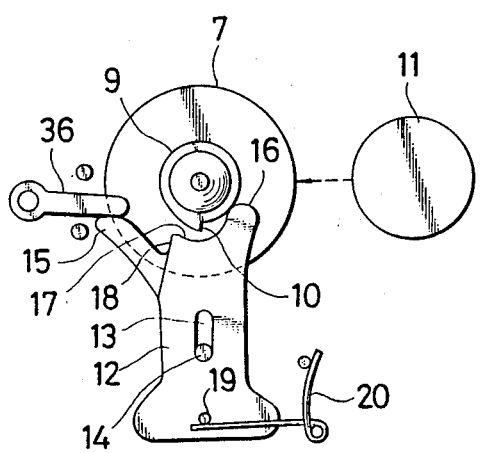
FIG. 8 is a partial plan view showing a yet another embodiment of the invention.

FIG. 8 shows a modified arrangement wherein a detecting member 36 has an axis of rotation displaced or offset from that of the reel receiving member 1. In the arrangement, the detecting member 36 contacts with the reel receiving member 1 so that a turning force of the reel receiving member 1 is applied to pivot the detecting member 36 in one direction. As a modification of the arrangement, a detecting member which is designed to make a non-arcuate reciprocating motion such as a linear reciprocating motion may possibly be employed.

Figure 9:
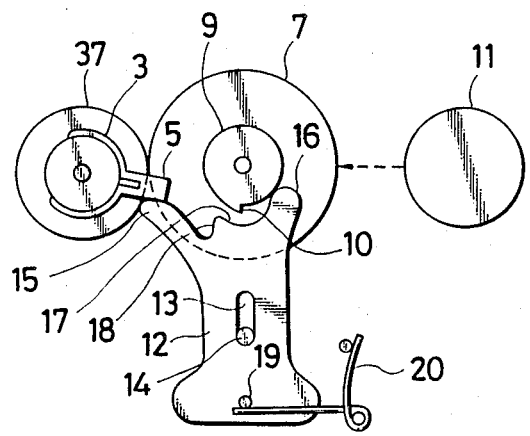
FIG. 9 is a partial plan view showing a still further embodiment of the invention.

Further, as shown in FIG. 9, a detecting member 3 similar to the detecting member 3 of FIG. 3 may be provided in a coaxial relationship with a rotary member 37 which is rotated and stopped in synchronism with the reel receiving member 1 and with which the detecting member 3 is contacted to obtain a pressing force of the detecting member 3 against the operating member 12.

Subsequently, different forms of detecting member employed in a rotation stopping detecting mechanism of a tape recorder will be described.

Figure 10:
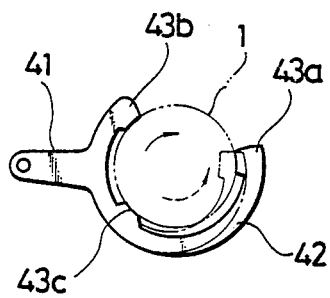
FIGS. 10 to 15 are plan views illustrating different forms of detecting member.

Referring first to FIG. 10, a detecting member 41 is formed from a thin synthetic resin plate and has a substantially C-shaped resilient contacting portion 42 having a shorter arm and a longer arm. The resilient contacting portion 42 has three contacting projections 43a, 43b and 43c formed at the opposite end portions and an intermediate portion thereof. The projections 43a and 43c are located on an inner side of the longer arm while the projection 43b is located on an inner side of the shorter arm of the resilient contacting portion 42, and the projection 43c is located nearer to the projection 43b than to the projection 43a. In an assembled condition of the detecting member 41 to a reel receiving member 1 which serves as a normally rotating member, the contacting projections 43a, 43b and 43c of the resilient contacting portion 42 are held in resilient frictional contact with an outer circumferential face of the bottom of an annular groove not shown of the reel receiving member 1.

The detecting member 41 having such a configuration as described above is very effective where it is applied to a tape recorder of the automatic reversing type. In particular, in a tape recorder of the automatic reversing type, left and right reel receiving members alternately serve as a take-up side reel receiving member and a supply side reel receiving member, and a contacting pressure between a reel receiving member and a detecting member acts, on the take-up side, to produce a detecting torque for detecting stopping of the reel receiving member, and on the supply side, to exert a so-called back tension to a magnetic to be supplied. The detecting torque desirably has a comparatively great magnitude so as to assure detection of stopping of the reel receiving member when the reel received member is stopped. To the contrary, the back tension is desirably minimized because it has a reaction that it makes a resisting force against feeding of a tape. With a structure wherein only a fixed torque is applied to the detecting member even if the direction of rotation of the reel receiving member is reversed, however, such a problem may possibly take place that a sufficient detecting torque is not assured or that the back tension may become too great, which will make designing difficult. Thus, where the intermediate contacting projection 43c is located nearer to one 43b of the other contacting projections 43a and 43b as shown in FIG. 10, when the reel receiving member 1 rotates in the direction indicated by an arrow mark of a full line, the contacting projection 43b is contacted strongly against an outer periphery of the reel receiving member 1 in the annular groove to cause the resilient contacting portion 42 to exert a force in a direction to narrow the opening of the resilient contacting portion 41. A relatively great torque, therefore, can be exerted to the detecting member 41. On the contrary, when the reel receiving member 1 rotates in the direction indicated by an arrow mark of a broken line in FIG. 10, the resilient contacting portion 42 is acted upon by a force in a direction to widen or open the opening thereof. Accordingly, a relatively small torque can be exerted to the detecting member 41.

The detecting torque and the back tension, therefore, can be set to desired magnitudes if the detecting member 41 is assembled to a left or right reel receiving member of a tape recorder of the automatic reversing type such that the direciton in which a greater torque is produced by the detecting member 41 may coincide with the feeding direction of a tape.

Figure 11:
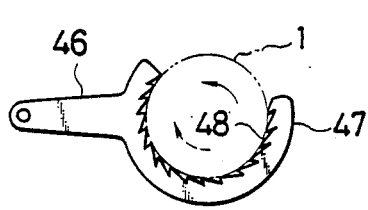

A similar effect can be anticipated by a detecting member 46 shown in FIG. 11. Referring to FIG. 11, the detecting member 46 has a substantially C-shaped resilient contacting portion 47 which has a large number of contacting projections or teeth 48 having a predetermined directivity formed on inner side thereof.

With the construction of the detecting member 46, when a reel receiving member 1 rotates in the direction indicated by an arrow mark of a solid line, the contacting projections 48 of the detecting member 46 act in such a manner as to bite into an outer periphery of the reel receiving member 1 in an annular groove not shown to cause the resilient contacting portion 47 to be acted upon by a force in a direction to narrow the opening of the resilient contacting portion 47. A comparatively great torque, therefore, can be exerted to the detecting member 46. On the contrary, when the reel receiving member 1 rotates in the direction indicated by an arrow mark of a broken line, the contacting projections 48 act in the direction opposite the biting direction, and accordingly a relatively small torque can be exerted to the detecting member 46.

Figure 12:
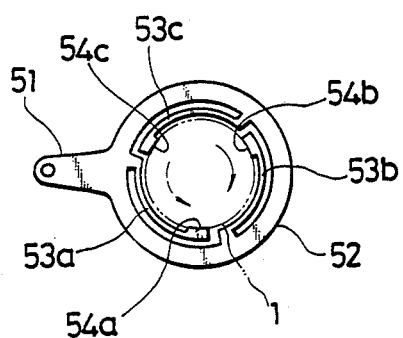

Referring now to FIG. 12, a detecting member 51 shown has an annular body 52 and three resilient contacting portions 53a, 53b and 53c formed at equal intervals on an inner side of the annular body 52. The resilient contacting portions 53a, 53b and 53c extend first radially inwardly by a very small distance from the annular body 52 and then in one circumferential direction toward the respective adjacent next resilient contacting portions 53b, 53c and 53a, respectively. Contacting projections 54a, 54b and 54c are formed at free ends of the resilient contacting portions 53a, 53b and 53c, respectively, for contacting with an outer circumferential face of a reel receiving member 1 in an annular groove not shown.

With the construction of the detecting member 51, when the reel receiving member 1 rotates in the direction indicated by an arrow mark of a solid line, the contacting projections 54a, 54b and 54c of the detecting member 46 act in such a manner as to bite into an outer periphery of the reel receiving member 1 in the annular groove. A comparatively great torque, therefore, can be exerted to the detecting member 51. On the contrary, when the reel receiving member 1 rotates in the direction indicated by an arrow mark of a broken line, the contacting projection 54a, 54b and 54c act in the direction opposite the biting direction, and accordingly a relatively small torque can be exerted to the detecting member 51.

Also with the detecting members 46 and 51 of FIGS. 11 and 12, respectively, such a special effect can be attained that the detecting torque and the back tension can be individually set to desired magnitudes by setting, when the detecting member 46 or 51 is to be assembled to a left or right reel receiving member of a tape recorder of the automatic reversing type, the detecting member 46 or 51 such that the direction in which a greater torque is produced may coincide with the feeding direction of a tape. Particularly in the case of the detecting member 51 showing in FIG. 12, since the three resilient contacting portions 53a, 53b and 53c are formed in an intergral relationship with the annular body 52, an effect can be attained that the resiliency of the resilient contacting portions 53a, 53b and 53c is not deteriorated readily and accordingly the resilient contacting portions 53a, 53b and 53c are superior in durability.

Durability of such resilient contacting portions can be improved also by other various means.

Figure 13:
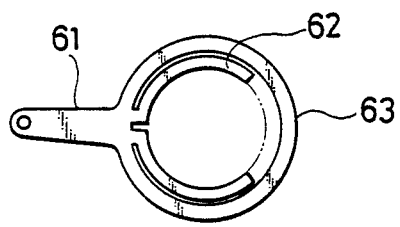

For example, a detecting member 61 shown in FIG. 13 has an integral annular body 63 which surrounds the outside of a substantially C-shaped resilient contacting portion 62 of the detecting member 61. The resilient contacting portion 62 is thus protected by the annular body 63 and improved in durability.

Figure 14:
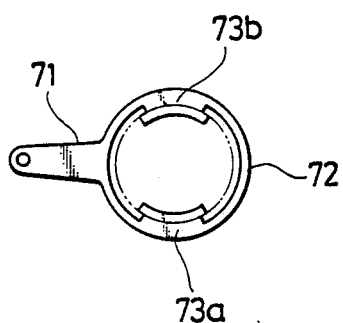

Another detecting member 71 shown in FIG. 14 has a resilient contacting portion 72 which is itself formed into an annular ring and has a pair of contacting portions 73a and 73b formed at diametrically opposite locations on an inner side thereof for contacting with an outer periphery of a reel receiving member in an annular groove. The resilient contacting portion 72 is improved in durability because it is formed itself into an annular ring.

Figure 15:
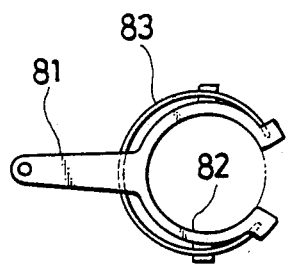

A further detecting member 81 shown in FIG. 15 includes a spring 83 formed from a metal wire which has the opposite ends thereof connected to the opposite ends of a substantially C-shaped resilient contacting portion 82 of the detecting member 81 and extends substantially along the C-shaped resilient contacting portion 82. Deterioration in resiliency of the resilient contacting portion 82 of the detecting member 81 is prevented or at least moderated by the metal wire spring 83 thereby to improve the durability of the same. In the detecting member 81, the metal wire spring 83 has a dual function of maintaining the resiliency of the resilient contacting portion 82 and reinforcing the contacting pressure to a reel receiver member.

Figure 16:
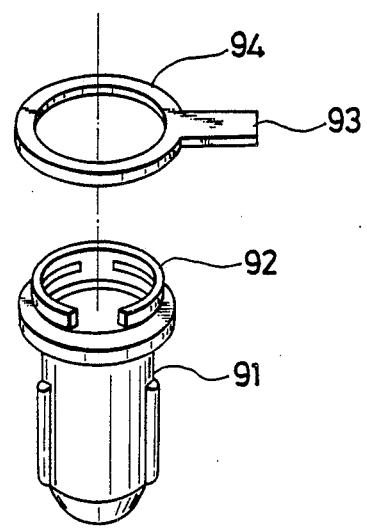
FIG. 16 is a fragmentary perspective view illustrating a different normally rotating member and a further different cooperating detecting member.

In any of the detecting members 3, 41, 46, 51, 61, 71 and 81 described hereinabove, a resilient contacting portion is provided on the side of the detecting member. Such a resilient contacting portion, however, may otherwise be provided on the side of a normally rotating member. Referring to FIG. 16, a substantially C-shaped resilient contacting portion 92 is formed at the top of a normally rotating member 91 which may be a reel receiving member of a tape recorder. The resilient contacting portion 92 is held in resilient frictional contact, due to its own resiliency, with an inner circumferential face of an annular portion 94 of a detecting member 93. With the structure described just above, a turning torque in the same direction as the direction of rotation of the normally rotating member 91 can be exerted to the detecting member 93 in a similar manner as in the arrangements described hereinabove.

While the present invention has been described in connection with a tape recorder, a rotation stopping detecting mechanism according to the present invention can be applied not only to a tape recorder but also to any other apparatus wherein stopping of a normally rotating member is to be detected mechanically.

Having now fully described the invention, it will be apparent to one of ordinary skill in the art that many changes and modifications can be made thereto without departing from the spirit and scope of the invention as set forth herein.

What is claimed is:

1. A rotation stopping detecting mechanism comprising: a normally rotating member normally rotating in one direction around a fixed axis said normally rotating member being normally held in frictional contact with a detecting member to exert a turning torque to said detecting member such that said detecting member detects stopping of rotation of said normally rotating member from disappearance of the turning torque by said normally rotating member, said normally rotating member having an outer peripheral edge, wherein said detecting member is fitted on said outer peripheral edge of said normally rotating member by way of a resiliently contacting portion which is provided on either one of said detecting member and said normally rotating member for resiliently contacting with the other of said detecting member and said normally rotating member under a radially acting resilient force of said resilient contacting portion thereby to produce a contacting pressure between said detecting member and said normally rotating member, and wherein said resilient contacting portion has a substantially C-shape in a plane perpendicular to the axis of said normally rotating member, and wherein a separate member is fixed to and extends between the ends of said C-shaped resilient contacting portion for maintaining the contacting pressure of said resiliently contacting portion.

2. A rotation stopping detecting mechanism as claimed in claim 1, wherein said separate member for maintaining the contacting pressure of said resilient contacting portion is a spring in the form of a metal wire.

3. A rotation stopping detecting mechanism comprising: a normally rotating member normally rotating in one direction around a fixed axis, said normally rotating member being normally held in frictional contact with a detecting member to exert a turning torque to said detecting member such that said detecting member detects stopping of rotation of said normally rotating member from disappearance of the turning torque by said normally rotating member, said normally rotating member having an outer peripheral edge, wherein said detecting member is fitted on said outer peripheral edge of said normally rotating member by way of a resiliently contacting portion which is provided on either one of said detecting member or said normally rotating member for resiliently contacting with the other of said detecting member and said normally rotating member under a radially acting resilient force of said resilient contacting portion thereby to produce a contacting pressure between said detecting member and said normally rotating member, and wherein said resilient contacting portion has a substantially C-shape in a plane perpendicular to the axis of said normally rotating member, and wherein said detecting member is formed from a thin synthetic resin plate, and said reilient contacting portion is provided on said detecting member.

4. A rotation stopping detecting mechanism as claimed in claim 3, wherein said resilient contacting portion of said detecting member contacts at three locations thereof with said normally rotating member, an intermediate one of the three locations being spaced by different distances from the other two locations on the opposite sides thereof.

5. A rotation stopping detecting mechanism comprising: a normally rotating member normally rotating in one direction around a fixed axis, said normally rotating member being normally held in frictional contact with a resilient detecting member to exert a turning torque to said detecting member such that said detecting member detects stopping of rotation of said normally rotating member from disappearance of the turning torque by said normally rotating member, said normally rotating member having an outer peripheral edge, and wherein said detecting member is fitted on said outer peripheral edge of said normally rotating member by way of a resiliently contacting portion which is formed integrally with said detecting member for resiliently contacting with said normally rotating member under a radially acting resilient force of said resilient contacting portion thereby to produce a contacting pressure between said detecting member and said normally rotating member, wherein said resilient contacting portion includes three or more resilient fingers extending inwardly and having free end portions thereof held in resilient contact with said normally rotating member of said detecting member.

6. A rotation stopping mechanism as in claim 5, wherein said fingers have tips at their distal ends and each of said fingers are inclined at substantially the same angle relative to the path of rotation of said tips.

* * * * *